United States Patent
Liggett et al.

(10) Patent No.: US 8,152,093 B2
(45) Date of Patent: Apr. 10, 2012

(54) LAMINATE STRUCTURE WITH ELECTRONIC DEVICES AND METHOD

(75) Inventors: Paul E. Liggett, Wooster, OH (US); Thomas M. Whiteleather, Uniontown, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 623 days.

(21) Appl. No.: 12/105,297

(22) Filed: Apr. 18, 2008

(65) Prior Publication Data

US 2009/0263633 A1 Oct. 22, 2009

(51) Int. Cl.
*B64B 1/14* (2006.01)

(52) U.S. Cl. ............. 244/30; 244/31; 244/125; 244/126

(58) Field of Classification Search .................. 244/1 A, 244/125, 126, 30, 31; 343/705, 708; 361/218
See application file for complete search history.

(56) References Cited

U.S. PATENT DOCUMENTS

| | | | |
|---|---|---|---|
| 4,583,702 A * | 4/1986 | Baldwin | 244/1 A |
| 4,839,771 A * | 6/1989 | Covey | 361/218 |
| 6,074,722 A | 6/2000 | Cuccias | |
| 6,979,479 B2 * | 12/2005 | Lavan et al. | 428/1.1 |
| 7,093,787 B2 * | 8/2006 | Garrettson et al. | 244/1 A |
| 7,448,572 B2 * | 11/2008 | Marimon et al. | 244/30 |
| 2006/0049305 A1 * | 3/2006 | Porter | 244/31 |
| 2007/0075184 A1 * | 4/2007 | Marimon et al. | 244/30 |
| 2007/0281570 A1 * | 12/2007 | Liggett et al. | 442/378 |
| 2009/0042037 A1 * | 2/2009 | Liggett et al. | 428/421 |
| 2009/0200416 A1 * | 8/2009 | Lee | 244/30 |

* cited by examiner

*Primary Examiner* — Tien Dinh
*Assistant Examiner* — Justin Benedik
(74) *Attorney, Agent, or Firm* — James C. Scott; Roetzel & Andress

(57) ABSTRACT

Various laminate structures and methods of making laminate structures are provided. In one embodiment, a laminate structure includes a base layer, a metallized layer comprising an electronic/embedded device which is adhered to the base layer. A coating layer which is adhered to the conductive layer, and a non-metallic dichroic layer adhered to the coating layer. In another embodiment, the non-metallic dichroic layer directly contacts the electronic/embedded devices of the conductive layer. The laminate structures herein can be used in the hull of the air vehicles to communicate with satellites and ground based receiving stations, for example. The electronic/embedded devices of the laminate structures provide a low weight solution to transmitting and receiving data within an air vehicle.

12 Claims, 2 Drawing Sheets

LAMINATE STRUCTURE WITH ELECTRONIC DEVICES AND METHOD

FIELD OF THE INVENTION

The present invention is generally directed to thin film electronic devices for use with lighter-than-air vehicles and the method for making the same. More specifically, the present invention relates to thin film electronic devices which are made part of the flexible fabric laminate structures used in the hull of lighter-than-air vehicles.

BACKGROUND OF THE INVENTION

Lighter-than-air vehicles (LTA), such as aerostats, blimps, or airships, are used in many different applications, such as near large sporting, entertainment or cultural events, or in large metropolitan areas to provide advertising or to provide high-level coverage of the events. Lighter-than-air vehicles are also used in high altitude applications, high altitude airships (HAA) for the purpose of military surveillance or weather monitoring. In such instances, the higher the vehicle can operate translates into an increased amount of area that can be viewed. Additionally, lighter-than-air vehicles that possess the ability to operate at altitudes above 50,000 feet, are not a hazard to commercial air traffic, are more difficult to detect and/or destroy, can be used for the surveillance of wide areas and thus provide a strategic and/or economic advantage.

Typically, the hull of these LTA and HAA vehicles are made from flexible fabric laminates structures which include lightweight materials which withstand a wide range of temperature variation, ozone degradation, exposure to ultraviolet radiation and daily expansion and contraction due to the wide temperature variations. For example, known material combinations can provide a laminate structure that that is substantially impervious to helium gas and provides protection from degradation, wind erosion and the like.

Lighter-than-air vehicles are also equipped to receive and relay communications, power, and other transmissions, either from stations located on the surface of the earth and to other earthed-based receiving stations, or to and from or between satellites and earth based receiving stations. Satellites can collect data from the surface of the earth or from the atmosphere via sensors installed on the satellites.

Although the use of transmission devices equipped on the LTA and HAA vehicles for relaying communications, power, etc., are well-established, the weight of the instrumentation can reduce operational capabilities by limiting the payload weight and/or shortening the flight time of the vehicle.

SUMMARY OF THE INVENTION

The present invention is generally directed to a lighter-than-air (LTA) vehicle, for example, a high altitude airship (HAA). The LTA vehicle comprises a flexible fabric laminate structure which is light in weight and is yet equipped to provide information about the laminate structure itself or its surrounding environment. In one embodiment, the present invention provides for a laminate structure which includes structural fabric base layer and a metal coated or metal particle containing film layer that typically is highly reflective of solar radiation for passive thermal management of LTA vehicles operating at high altitudes. A thermal management film layer, which also serves as the helium permeation barrier, is laminated to the structural fabric base layer and includes an integrated electronic device for processing information. The electronic devise can be bonded to the thermal management layer and/or printed and etched into the metal coating like a printed circuit. The laminate structure also comprises a protective coating layer, such as polyvinylidene fluoride (PVDF) which is resistant to deterioration from ozone and ultra violet radiation and is adhered to the metal coated layer on the surface opposite the structural fabric layer. A highly reflective, non-metallic, dichroic layer is laminated over the electronic devices to provide thermal management without disrupting electronic, radar or power transmission and reception. In another embodiment the laminate structure makes up at least a portion of the hull of the LTA vehicle. The integration of the electronic device within the hull eliminates the need for separate "stand-alone" electronic structures and can reduce overall weight of the LTA vehicle.

In another embodiment, the present invention is directed to a transmission system which includes a lighter-than-air vehicle (LTA) which functions to transmit data to and from the LTA. In another embodiment, the transmission system includes a LTA vehicle which transmits data to and from at least one of a satellite and/or an earth-based receiving station. The hull of the vehicle comprises a laminate structure comprising an electronic device which transmits and/or receives signals to or from, or both, a satellite, an earth-based receiving station, and other LTA or HAA vehicles.

In yet another embodiment, the present invention provides for a process for producing a laminate structure used in a LTA vehicle comprising: forming at least one electronic device on a conductive layer; joining the conductive layer to a base layer joining a coating layer to the conductive layer along a surface opposite the base layer; and joining a non-metallic dichroic layer to the electronic device of the conductive layer.

BRIEF DESCRIPTION OF THE DRAWINGS

The various embodiments of the present invention can be understood with reference to the following drawings. The components are not necessarily to scale. Also, in the drawings, like reference numerals designate corresponding parts throughout the several views.

DETAILED DESCRIPTION OF THE INVENTION

Figure 1:
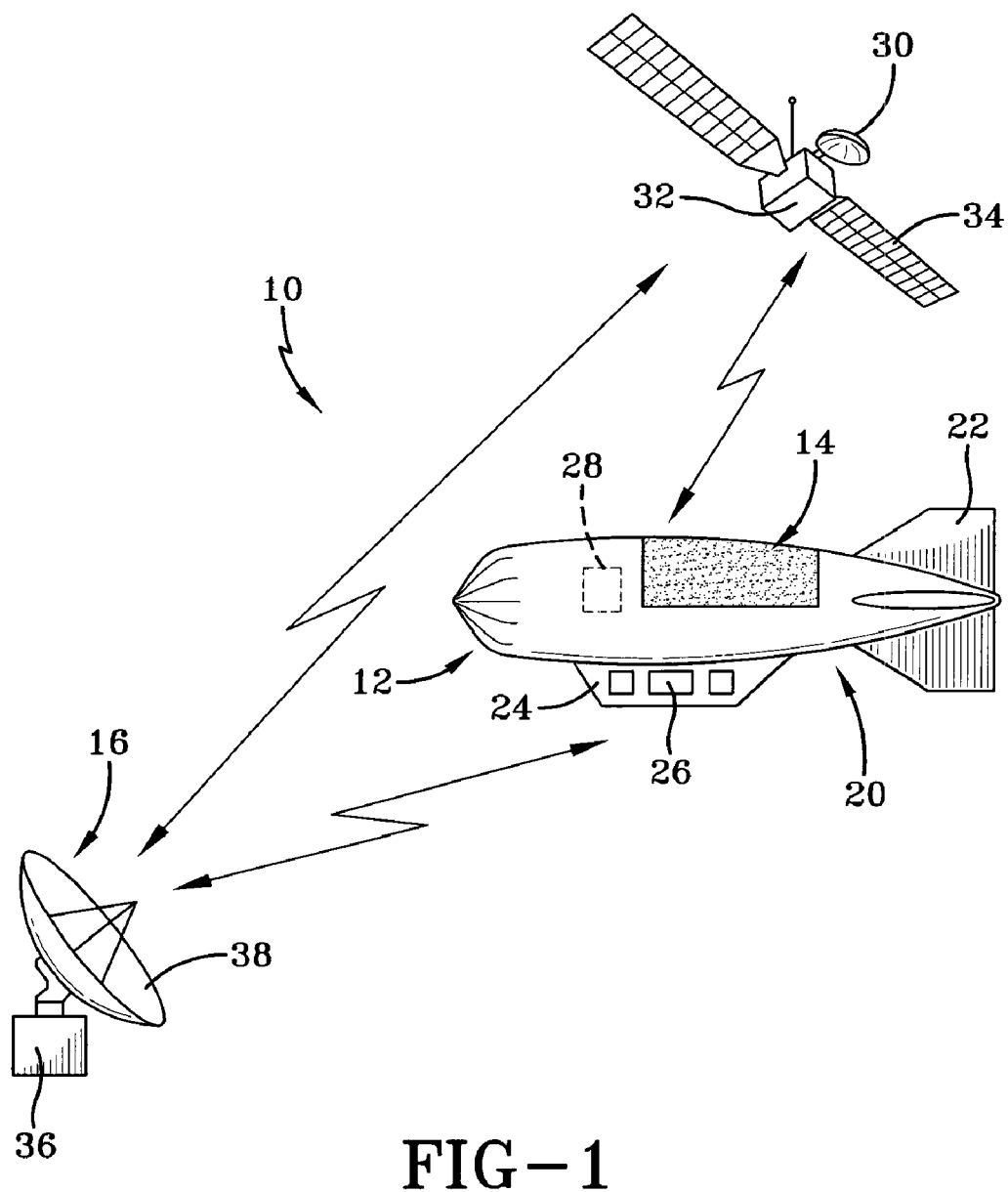
FIG. 1 is a schematic illustration of a transmission system which includes a lighter-than-air vehicle, according to an embodiment of the present invention.

FIG. 1 is a schematic illustration of the transmission system 10 according to an embodiment of the present invention. Transmission system 10 includes a lighter-than-air vehicle 12 which communicates with a satellite 14 and an earth-based receiving station 16. Lighter-than-air vehicle 12 includes a hull 20, and optionally, at least one stabilizing fin 22. Lighter-than-air vehicle 12 also includes a payload 24 which may carry information and communication processing equipment 26 for surveillance and weather monitoring, or onboard power supply, for example. The lighter-than-air vehicle 12 can remain aloft for indefinite periods of time via an onboard power supply and devices for replenishing the power supply without returning to the earth. As seen in FIG. 1, a lighter-than-air vehicle 10 consists of a flexible fabric laminate skin 12 which contains a gas, such as helium, to provide lift for the LTA vehicle. Affixed to the top surface of the LTA vehicle are photovoltaic cells 18 which take advantage of exposure to sunlight and convert the solar energy to electrical energy for use by the LTA vehicle. The photovoltaic cells typically are attached to the outer fabric layer.

The lighter-than-air vehicle 12 will be referred to as an LTA or LTA vehicle, but it can be appreciated that the present invention is directed to a flexible fabric laminate construction that is applicable to any lighter-than-air vehicle, platform, or other inflated structure, such as an aerostat, blimp, airship, balloon, or any floating object that is tethered or un-tethered, propelled or unpropelled, or used at any altitude. Further, the LTA vehicle 12 is shown as including a hull 20 and at least one stabilizing fin 22, but the invention could be applied if no fins are provided. Also, hull 20 is shown as having an oblong configuration, it will be appreciated that any shape—sphere, ellipse, parabolic, tear-drop, and the like can be used, and the LTA vehicle 12 can carry a payload 24 which may include personnel, surveillance devices, weather monitoring equipment, communications equipment and the like. The size of payload varies in accordance with the size of the vehicle, and can be carried externally, internally, or incorporated into the material such as for radar transmit/receive applications. Still further, no propelling means, such as engines and/or propellers, is shown since the present invention can be employed on propelled as well as LTA vehicle having no means of propulsion.

Typically, these LTA vehicles are made from laminates of materials that are substantially imperious to helium or hydrogen gas, withstand a wide range of temperature variation, ozone degradation, exposure to ultraviolet radiation, expansion and contraction in view of the wide temperature variations experienced in diurnal cycles, and extreme wind and weather forces. For example, U.S. Pat. No. 6,074,722 to Cuccias teaches a fabric laminate made of a layer of polyurethane resin that is used to bond layers of high strength liquid crystal thermotropic (melt spun) polyester (VECTRAN®), aromatic polyaramide (KEVLAR®), or polyester (DACRON®) fiber woven yarn, to a polyvinyl fluoride (TEDLAR@) or polyethylene terephthalate (MYLAR@) film and has an outer layer of a material that is resistant to degradation by ultra violet radiation. U.S. Pat. No. 6,979,479 teaches a laminate of a liquid crystal polymer fiber yarn layer (VECTRAN®) as an interior surface, an adhesive layer, a polyimide layer, and a polyvinylidene fluoride (PVDF) layer which forms the exterior surface. For fabrics for lighter-than-air vehicles operating at high altitudes, it is also typical to have a thin aluminum coating as one of the layers to reflect most of the incident solar radiation, reduce helium permeation, minimize the affects of lightening strikes, and provide a means for uniform static electric distribution over the hull surface.

According to an embodiment of the present invention, at least a portion of the hull 20 includes an electronic device 28 (shown in phantom) embedded within the fabric laminate hull material which can provide, for example, information about the condition or state of the hull 20 or transmit/receive information about its surrounding environment. Details regarding the hull construction will be further described below.

Satellite 14 is typical of those in the art which can be used for communications, surveillance, and/or navigation, for gathering photographic data, weather-related data or some other type of data. Satellite 14 includes an electronic device 30 for processing information such as data and communications. For example, the satellite can include both a transmitter, which sends information, a receiver which is the observing device, or a device having the combined transmit/receiving function, referred to as a transceiver antenna. The satellite 14 can receive data input from a remote source via the electronic device 30, for example, a transceiving antenna, or a sensing device 32. Solar panels 34 collect energy from the sun to power the systems and subsystems of the satellite 14. The satellite 14 may be at a low earth orbit satellite, a medium earth orbit satellite, a high altitude elliptical satellite, and/or a geosynchronous earth orbit satellite. The earth-based receiving station 16 receives various data such as photographic data, weather-related data, etc. transmitted by the lighter-than-air vehicle 12 or satellite 16, or both. The earth-based receiving station 16 also includes a transceiving dish 38 and a support base 36 for supporting the transceiving dish 38.

In one embodiment, the transmission system 10 functions by transmitting data to and from the LTA vehicle 12. In another embodiment, the transmission system functions by transmitting data to and from the LTA vehicle 12 to and from at least one of the satellite 14 and the earth-based receiving station 16. For example, signals can be transmitted from the earth-based receiving station 16 to the lighter-than-air vehicle 12, or from the satellite 14 to the LTA vehicle 12. As another example, signals can be transmitted from the earth-based receiving station 16 to the LTA vehicle 12, and then to the satellite 14. As another example, the earth-based receiving station 16 can transmit data via its transceiving dish 38, for example via microwave frequencies. The lighter-than-air vehicle 12 then receives these microwave transmissions via electronic device 28 and then transmits the data to the satellite 14. In another example embodiment, the satellite 14 receives data input from a remote source (not shown) via its transceiving antenna 30 or its sensing device 32. The satellite processes the received data and converts it, for example, into data of optical or higher microwave frequencies and transmits the data to the LTA vehicle 12. Therefore, LTA vehicles 12, satellites 14, and earth-based stations 16 can be used in transmissions beamed towards and away from the earth's atmosphere.

Figure 2:
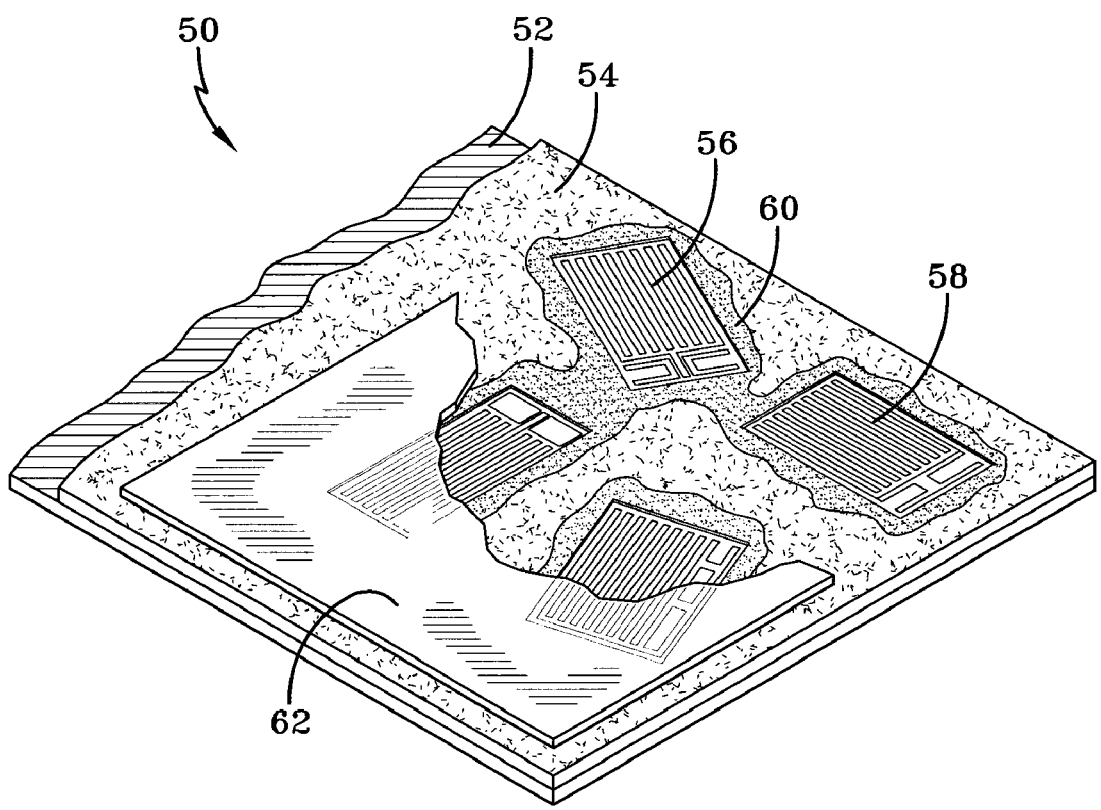
FIG. 2 is a schematic illustration of cut-away portion of the hull of the lighter-than-air vehicle of FIG. 1 showing the construction thereof, according to another embodiment of the present invention.

FIG. 2 is a schematic illustration of a flexible fabric laminate structure 50 which is a cut-away portion of the hull 20 of the lighter-than-air vehicle 12 shown in FIG. 1, according to an embodiment of the present invention. Although flexible fabric laminate structure 50 is illustrated as a LTA vehicle, it can be appreciated that the present invention is directed to all laminate structures that are applicable to any LTA or HAA platform, or other inflated structure, such as an aerostat, a blimp, an airship, a balloon, or any floating object that is tethered or un-tethered. For example, the present invention could be used in hot-air balloons, regular helium balloons, weather balloons, sails, parachutes, inflated buildings and any application where an electronic device is used to transmit data and communications while the flexible fabric laminate structure provides superior properties for use in withstanding the rigors of an outdoor environment.

A flexible fabric laminate structure 50 is provided which is particularly suited for high altitude applications. In one embodiment, the flexible fabric laminate structure 50 of hull 20 (FIG. 1) includes a structural fabric base layer 52, a metal coated polyimide (e.g. KAPTON®) film layer 54 adhered to the base layer 52. Layer 54 comprises at least one electronic device, for example electronic devices 56 and 58 etched into the metal coating. In one embodiment, flexible fabric laminate structure 50 and electronic devices 56, 58, are at least a portion of hull 20 shown in FIG. 1 with the embedded electronic device shown at 28. The metal coated polyimide layer 54 functions to reflect most of the incident solar radiation, retain helium, minimize the effects of lightning strikes, and provides a means for uniform static electric distribution over the surface of the hull 20, for example. The reflective metal coating of layer 54 can include sputtered or vacuum deposited metal coatings such as aluminum, sliver, gold and copper and alloys of these metals, non-metallic particles coated with these metals or alloys of these metals and highly reflective, non-metallic dichroic film, coatings and/or particles. The reflective metal coating of layer 54 also serves as the basis and means for integrating circuits, sensors and antennas into a flexible fabric laminate as described by this invention.

The electronic devices 56 and 58 can include one of several devices which are the same or different. For example, electronic device 56 can be a strain gauge, which monitors the condition, or properties of the flexible fabric laminate structure 50, and electronic device 58 can be a transceiver antenna for processing data and communications. Active electronically scanned array (AESA) sensors, which use many "active" transmit/receive elements, and passive electronically scanned array (PESA) antennas, which are powered by a single radio frequency (RF) source which feeds numerous emitting elements, can be integrated directly into the fabric laminate structure 50 by the application of this invention. Electronic devices include, but are not limited to, radar antennas, telecommunications relay antennas, strain gauges, photovoltaic cells, thermocouples, printed circuits, wiring, ozone monitors, radio active particle detectors, chemical pollution monitors, animated advertising signs and any electrical or non electrical device that can be etched or printed on a metallized film.

These and other devices which are used for data collection, communication, and/or energy transmission, can be etched in a metallized film, for example, via photolithography, which is a process which involves etching and is well known in the art. Other methods of integrating one or more electronic devices into the conductive layer 54 include, but are not limited to, bonding of printed etched films and/or printing using conductive inks. In one embodiment, the patterns of electrical conduit have spacing between the conductive traces that allows for adequate heat transfer, depending upon the type of electronic device and the material which makes up the various layers of flexible fabric laminate structure 50. For example, the spacing and width in the etching of the metallic coating of layer 54 are limited only by power requirements of the electrical devices and the photolithography processes known in the art and production of printed circuits. The electronic devices 56, 58, can be etched, deposited, printed and/or bonded onto the polyimide film of layer 54 and may be located on one side or even both sides of the polyimide film. Generally the electronic devices 56, 58 are located on the side of the polyimide film of layer 54 that is opposite the base fabric layer 52

Flexible fabric laminate structure 50 also can include a coating layer 60 which is adhered to the metallic coating of layer 54 on a surface opposite the base fabric layer 52. The coating layer 60 can be a non-metallic dichroic composition which is in contact with the metal coating of layer 54 while surrounding, at least partially or entirely, the electronic devices 56 and 58. The coating layer 60 is employed especially when the devices are etched into the metallic film 54 to compensate for the loss of metallic film since the dichroic film will have reflective properties as well. The non-metallic dichroic layer is highly reflective film or coating comprised of a multi-layer composite of alternate layers of different refractive index materials. An example of a dichroic film is VICUITY® manufactured by 3M Corporation and is made with several hundred alternating layers of polyethylene terephthalate (PET) and polyethylene naphthalate (PEN). The non-metallic dichroic film 60 serves as a thermal management coating and minimizes the exposure of the electronic devices, for example 56, 58, and other layers of the laminate structure to ozone and ultra violet radiation. The non-metallic dichroic layer 60 ensures radio frequency (RF) transmission to and from the electronic devices, for example transceiver antennae 58.

Coating layer 62 can be a clear or transparent layer and, preferably, is made of polyvinylidene fluoride (PVDF) to protect the metal coating of layer 54 and the integrated electrical devices 56, 58 from damage and corrosion and is resistant to ozone and ultraviolet radiation. The fabric layers 52 and 54 are ultimately covered by PVDF coating layer 62, such that any electrically conductive conduits are insulated from one another by the polyimide film of layer 54 and protected by the PVDF coating. In another embodiment, the electrical devices may not be covered by layer 60 to allow bonding of other films, such as PVDF coating 62, and/or other electronic devices on top of electronic devices 56, 58.

The thickness of base fabric layer 52, may range from 0.004 to 0.020 inches in thickness depending on the strength on the woven cloth. The metal-coated polyimide layer 54 may range from 0.0003 to 0.001 inches in thickness including the highly reflective metal coating which is typically 800 to 1200 Angstroms. The electronic devices 56, 58 may have etched circuitry ranging from 0.0005 to 0.500 inches depending on the function of the electronic devices and the power requirements. The thickness of the etched circuitry may also be increased by electroplating depending on power requirements of the electrical devices. The thickness of the PVDF protective coating may range from 0.0002 to 0.001 inches and the highly reflective VICUITY® dichroic film is available in approximately 0.0025 inch thickness. The total thickness of flexible fabric laminate 50 may range from 0.008 to 0.026 inches which is mostly controlled by the weave and strength of the base fabric layer 52. The thickness of each layer is selected to be as thin as practical to minimize the fabric laminate weight.

In one embodiment, the laminate structures of the present invention provide for high strength and low weight characteristics which allow a lighter-than-air vehicle to obtain maximum altitude while still providing light weight construction so as to increase the amount of payload 24 (FIG. 1) that can be carried by lighter-than-air vehicle 12.

The hull 20 of the air vehicle includes a combination of materials utilized to make up the flexible fabric laminate structure. The combination of the materials utilized in the flexible fabric laminate constructions of the present invention provides, among other things, excellent permeability control to retain the LTA gas. In another instance, the flexible fabric laminate constructions of the present invention also provide an additional amount of threat deterrence that may be encountered from infrared or laser type detection devices. Furthermore, in another embodiment of the present invention, the materials that are used to form the flexible fabric laminate constructions are flexible and can withstand wide temperature variations. For example, such temperature variations can range anywhere from about −90° C. to about +70° C. In view of the wide temperature and pressure variations experienced by high altitude LTA vehicles, the flexible fabric laminate structure 50 of the present invention can be flexible when subjected to a wide range of atmospheric and/or physical conditions.

It is also desirable that, in one embodiment, the flexible fabric laminate structure 50 of the present invention be ozone and ultraviolet light resistant and have the necessary gas permeability characteristics. In still another embodiment, it is desirable for the flexible fabric laminate material to have high altitude capabilities. It is believed that the constructions presented herein allow vehicle 10 to operate at altitudes of up to about 150,000 feet.

The metal coated polyimide layer 54 can include sputtered or vacuum deposited metal coatings such as aluminum, sliver, gold and copper and alloys of these metals, non-metallic particles coated with these metals or alloys of these metals and highly reflective, non-metallic dichroic film, coatings and/or particles. The reflective metal coating of layer 54 also serves at the basis and means for integrating circuits, sensors and antennas into a flexible fabric laminate as described by this invention.

The process for producing flexible fabric laminate structure 50 according to an embodiment of the present invention includes forming at least one electronic device 56, 58 into the metallic coating on polyimide layer 54; joining the metal coated polyimide layer 54 to a base fabric layer 52; casting or laminating a PVDF protective layer 62 to the metallic coating of layer 54 on a surface opposite the base layer 52; and joining a non-metallic dichroic layer 60 to the at least one electronic device of that is etched, deposited and/or printed on the polyimide film of the layer 54. Methods by which the various layers of flexible fabric laminate structure can be joined include, but are not limited to, heat, pressure, vacuum and the use of adhesives.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

We claim:

1. A flexible fabric laminate structure used in lighter-than-air vehicles comprising:
    a flexible fabric base layer;
    a metallic coated film layer joined to the base layer, and comprising one or more electronic devices;
    a protective coating layer joined to the metallic coated film layer along a surface of the metallic coated film layer opposite the flexible fabric base layer;
    a non-metallic dichroic layer joined to the electronic device, and
    wherein the laminate structure is at least a portion of a hull of a lighter-than-air vehicle.

2. The laminate of claim 1, wherein the electronic device is selected from the group of: radar antennas, telecommunications relay antennas, strain gauges, photovoltaic cells, thermocouples, printed circuits, wiring, ozone monitors, radio active particle detectors, chemical pollution monitors, animated advertising signs and any electrical or non electrical device that can be etched or printed on a metallized film.

3. The laminate of claim 1, wherein the metallic coating comprises materials selected from the group of: sputtered or vacuum deposited metal coatings such as aluminum, sliver, gold and copper and alloys of these metals, non-metallic particles coated with these metals or alloys of these metals.

4. The laminate of claim 1, wherein the non-metallic dichroic layer comprises a group of materials made from several alternating layers of materials with different refractive indexes such as polyethylene teraphthlate (PET) and polyethylene napthalate (PEN) or silicone dioxide and titanium dioxide.

5. The laminate of claim 1, wherein the coating layer joined to the metallic coated film layer covers and surrounds the electronic device.

6. The laminate of claim 5, wherein the coating layer at least partially covers the electronic device.

7. The laminate of claim 1, wherein the non-metallic dichroic layer at least partially covers the electronic device.

8. A system used in lighter-than-air vehicles for the transmission of data comprising:
    a lighter-than-air vehicle comprising a laminate structure of at least two layers, and one of the at least two layers is a metallic coated film layer;
    the laminate structure of the lighter-than-air vehicle comprises an electronic device embedded within the metallic coated film layer to transmit signals; and
    wherein the laminate structure is at least a portion of a hull of the lighter-than-air vehicle.

9. The system of claim 8, wherein the system for transmission comprises at least one of a satellite and an earth-based receiving station.

10. A process for producing a laminate structure used in a lighter-than-air vehicle, the process comprising:
    forming an embedded electronic device onto a metallic coated film layer;
    joining the metallic coated film layer to a flexible fabric base layer;
    joining a coating layer to the metallic coated film layer along a surface opposite a flexible fabric base layer;
    joining a non-metallic, dichroic layer to the electronic device; and
    wherein the laminate structure is manufactured as at least a portion of a hull of the lighter-than-air vehicle.

11. The process of claim 10, wherein coating layer is joined to the metallic coated film layer and embedded electronic device.

12. The process of claim 10, wherein coating layer is joined to the metallic coated film layer without contacting the embedded electronic device.

* * * * *